United States Patent
Mu-Tung et al.

[11] Patent Number: 5,514,864
[45] Date of Patent: May 7, 1996

[54] PHOTO ELECTRIC FEEDBACK COMPENSATION CONTROLLED APPARATUS

[75] Inventors: Wun Mu-Tung; Shih-Chung Chang, both of Hsinchu, Taiwan

[73] Assignee: Umax Data System Inc., Hsinchu, Taiwan

[21] Appl. No.: 217,904

[22] Filed: Mar. 25, 1994

[51] Int. Cl.⁶ .................................................. G01J 1/32
[52] U.S. Cl. ...................... 250/205; 250/208.1; 358/475; 358/482
[58] Field of Search ................................ 250/205, 208.1, 250/214 RC; 358/475, 482, 483

[56] References Cited

U.S. PATENT DOCUMENTS

| | | | |
|---|---|---|---|
| 4,677,287 | 6/1987 | Ejima | 250/205 |
| 4,728,803 | 3/1988 | Catchpole et al. | 358/482 |
| 4,917,031 | 4/1990 | Itoh | 250/205 |
| 5,406,070 | 4/1995 | Edgar et al. | 250/205 |

*Primary Examiner*—Edward P. Westin
*Assistant Examiner*—Jacqueline M. Steady
*Attorney, Agent, or Firm*—Lowe, Price, LeBlanc & Becker

[57] ABSTRACT

An apparatus for photo-electric automatic feedback compensation control is used with a charged coupled device (CCD) scanner to efficiently bring the CCD scanner into optimal operating range by controlling the output intensity of a light source based upon output readings from the CCD. A voltage controlled power supply drives a light source to emit light through an optical system to irradiate a CCD scanner. The voltage induced in the CCD scanner is output and manipulated to produce a digital control signal. When the photo-electric conversion rate of the CCD is too high, the light emitting intensity of the light source is reduced based upon the output of the CCD. When the photo-electric conversion rate of the CCD is too low, the output intensity of the light source is increased based upon the output signal of the CCD scanner. Thus, the signal-to-noise (S/N) ratio can be increased without necessity of manual adjustment, and the different problems generated by differences in apparatus characteristics or different environments and timing can be easily overcome.

6 Claims, 3 Drawing Sheets

PHOTO ELECTRIC FEEDBACK COMPENSATION CONTROLLED APPARATUS

BACKGROUND ART

The present invention relates to a photo-electric induction controlled apparatus used on an optical scanner, and more particularly relates to a photo-electric feedback control apparatus using a closed loop automatic control system controlling a light source to emit optional light intensity.

TECHNICAL FIELD

Generally, in the operation of a charged coupled device (CCD) scanner light is reflected from (or penetrated through) a reflective original copy (or an admitting to light penetration original copy), and then transmitted to the CCD via a group of lenses. FIG. 1 depicts the photo-electric effect characteristics curve of a CCD after it has been irradiated by light. In FIG. 1, the oblique line or curve extending from a zero level of exposure (the product of the exposure time and the intensity of illumination) to the $E_1$ level of exposure (the minimum amount of exposure necessary to reach the saturation voltage Vs) represents the operating range of the CCD. The slope of the curve represents the photo-electric conversion rate. When the light exposure time is fixed, the abscissa in FIG. 1 represents the intensity of the illumination.

In the operation range of a CCD, the output voltage of the CCD is proportional to the product of the lens focusing effect, original copy reflection rate (or penetration rate if the original copy admits to light penetration) and brightness of the light source. When the lens focusing effect and the brightness of the light source are fixed, then the output voltage of the CCD is proportional to the reflection rate of the reflective original copy (or the penetration rate of an original copy admitting to light penetration). Also, the contrast of the image of the original reflective copy (or an original copy admitting to light penetration) is proportional to the reflection rate (or penetration rate) of the original copy. Therefore, the output voltage of the CCD is proportional to the contrast of the image of the reflective original copy (or original copy admitting to light penetration). In FIG. 1, the voltage of the CCD is proportional to the contrast of the image within the operation range of the CCD. Therefore, the CCD can be used to control contrast of the image.

It is understood that the aforementioned characteristics of CCD operation are expected to occur under ideal conditions. However, there are some problems in the practical application of such devices which must be overcome. For example, even with a light source having the same specifications and manufactured by the same manufacturer, such as Harrison Cold Cathode Lamp, the deviation in brightness among such devices is 20%. Also, for a CCD, such as a Toshiba 140 AC, the difference in the photo-electric conversion rate for each product is ±30%. If these two components are used as the image scanning elements on an optical scanner, then the total deviation range generated by the different photo scanners on the same image are as follows:

upper limit: [(100+20)%×(100+30)%]=156% lower limit: [(100−20)%×(100−30)%]=56%

It is understood from the abovementioned description that in a monochrome CCD, the sensibility power of the CCD for monochromatic contrast is proportional to the product of the light source brightness and the monochromatic contrast of the image of the original copy (within the range below the CCD saturation voltage). Therefore, the following defects will be generated if no special adjustments are made:

(1) If a CCD with a relatively high photo-electric conversion rate is combined with a light source having relatively high intensity of light emission, then the CCD reaches its saturation voltage even when scanning a non-pure white (that is gray white) object. Thus, the CCD cannot analyze gradations between pure whiteness and gray whiteness. In other words, the gray scale gradation is reduced.

(2) If a CCD with a relatively low photo-electric conversion rate is combined with a light source having a relatively low intensity of light emission, then the CCD cannot reach its saturation voltage even when the CCD scans a pure white image. Thus, the output signal level of the CCD is insufficient so that the S/N is small, and the quality of the image is poor.

In conventional photo-electric sensing systems, method (2) as mentioned above is used in the design of the combination of CCD/light source (in order to avoid multiple manual adjustments. A CCD having a relatively low photo-electric conversion rate is used with a light source having a relatively low intensity of light emission. A current/voltage amplifier with a variable resistor is also used to amplify the output signal to the required level thereby containing a desired gray gradation level. Normally the amplification used for the CCD output signal is adjusted before the shipment of the scanning system.

However, there are some problems in the conventional amplification adjustment:

(1) Amplifying the image signal using a voltage/current amplifier cannot increase the S/N ratio because the noise is also amplified simultaneously;

(2) The problems of system characteristic deviations caused by differences in the timing of the CCD, light source characteristics and changes in environment cannot be overcome.

SUMMARY OF THE INVENTION

It is the object of this invention to eliminate the characteristic differences in optical scanners caused by deviations in the photo-electric characteristics of the elements constituting the scanner.

It is another object of the present invention to optimize the characteristics of optical scanners.

It is still a further object of the present invention to increase the speed and efficiency of optical scanners.

These and other objects of the present invention are accomplished in a first aspect of the present invention including a photo-electric feedback compensation-controlled imager. The imager includes a power supply operating responsive to a predetermined voltage and a feedback signal so as to produce an output power. Also included is a light source operating responsive to the output power to emit a light signal. The light is reflected upon a charge coupled device operating responsive to the light signal so as to generate an analog image output signal. The system is controlled by a central processing unit which operates responsive to the analog image output signal from the CCD. The central processing unit includes: means for generating the feedback signal; means for measuring image signal strength; first means for increasing the feedback signal based upon the image signal strength until the image signal strength no longer increases in response to an increase in the feedback signal; second means operating responsive to the first means for decreasing the feedback signal strength based upon image signal strength until a first decrease in image signal strength occurs; and means for storing a feedback signal value corresponding to the first decrease in image signal strength.

DESCRIPTION OF THE PREFERRED EMBODIMENT

Figure 2:
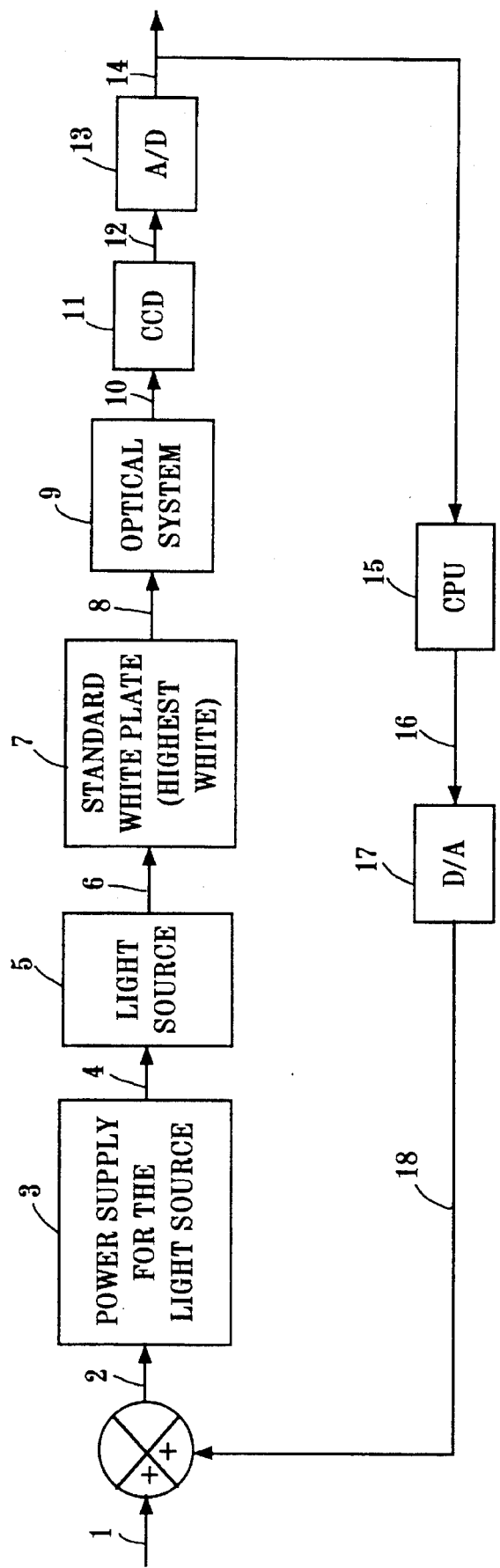
FIG. 2 is a block diagram of an embodiment of the present invention.

In the embodiment depicted by FIG. 2: numeral 1 represents the predetermined input voltage; 2 represents an adder; 3 represents a power supply for the light source; 4 represents the output power; 5 represents a light source; 6 represents a light output; 7 represents a white plate; 8 represents a second light output; 9 represents an optical system; 10 represents a third light output; 11 represents a CCD; 12 represents a CCD output voltage; 13 represents an A/D converter; 14 represents a digital image output signal; 15 represents a CPU; 16 represents a digital control signal; 17 represents a D/A converter; and 18 represents a feedback voltage control signal.

The output power 4 is generated from the power supply 3 for the light source 5, and is controlled by the predetermined voltage 1. This output power is used to control the light source 5 to emit a first output 6 with a first brightness level. This light irradiates a standard white plate 7 (highest white reflective original copy), and is reflected as light output 8 having a second brightness. Light output 8 is introduced through the path of the optical system 9. The resulting third light output 10 has a third brightness level and is directed to irradiate the CCD 11. As a result, an analog CCD output voltage 12 is produced due to the photo-electric characteristics of the CCD. The voltage 12 is converted by an A/D converter 13 to digital image output signal 14. The digital image output signal 14 is then supplied to CPU. After signal 14 is compared to a predetermined value in the CPU 15 (for example, when the analog signal is converted to a digital signal with 8 digits, the predetermined value of the highest white gray gradation can be set at a value of $2^8-1=255$), a digital control signal 16 is generated. The digital control signal 16 is supplied to a D/A converter 17 and the D/A converter 17 generates the analog feedback voltage control signal 18. This feedback voltage control signal, after being added to the predetermined voltage 1, produces a new voltage. The new voltage is used to adjust the output power 4 of the power supply to drive the light source 5. Thus, a CCD 11 having a relatively high conversion rate when combined with the aforementioned light source control is capable of adjusting the intensity of the light emission of the light source to a lower level. Also, a CCD 11 having a relatively low conversion rate when combined with the aforementioned light source control light source is capable of adjusting the intensity of the light emission of the light source to a higher level. This function can be repeated several times and the CCD adjusted to reach its optimum range of saturation voltage. Thus, the photo-electric characteristics of CCD 11 are adjustable to operate in its optimum operational range wherein the gray gradation range of the CCD 11 can reach a maximum value.

Figure 3:
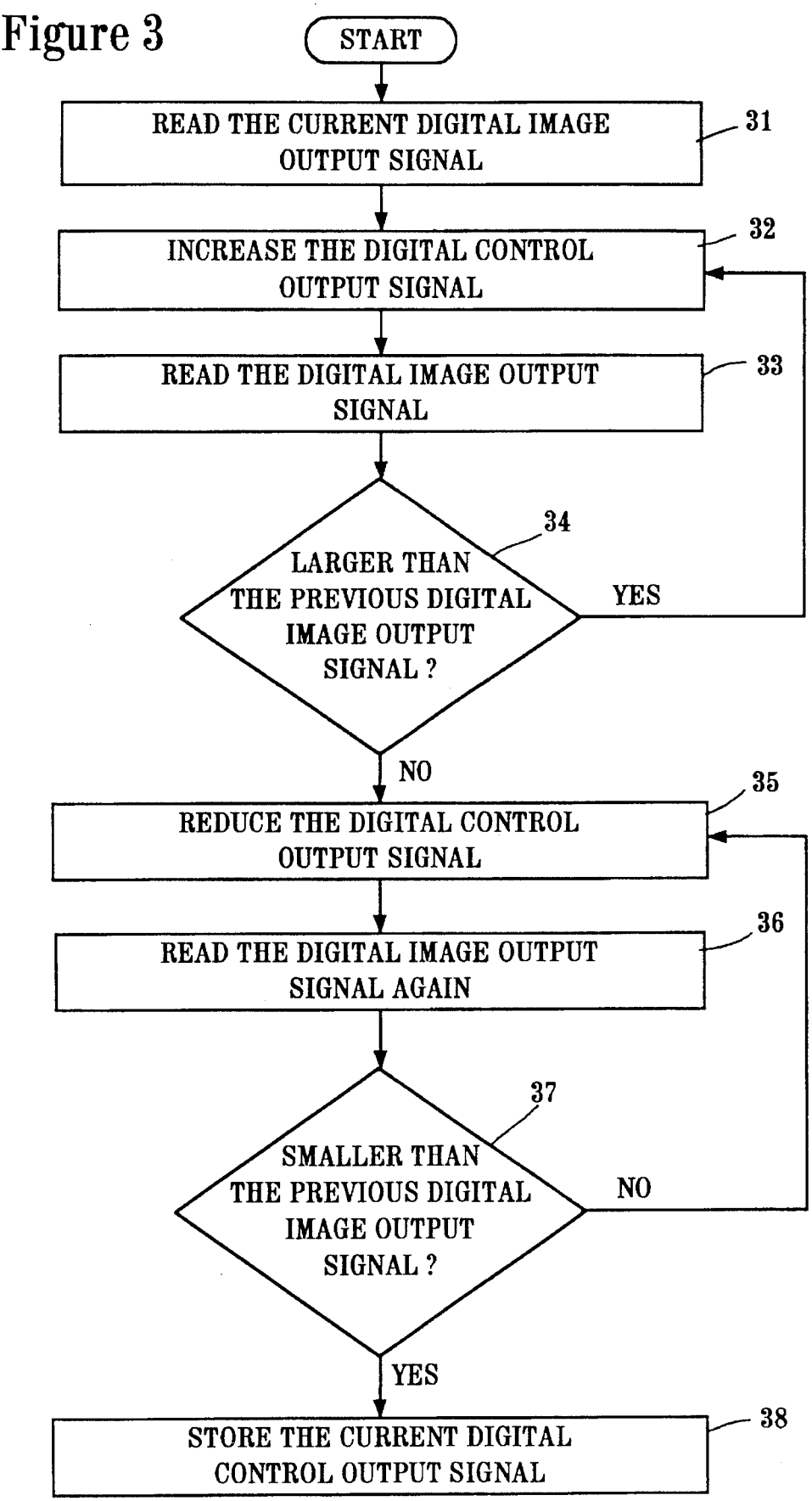
FIG. 3 is a flow chart depicting the operational process of the embodiment of FIG. 2.

In the abovementioned embodiment, CPU 15 includes both software and hardware. The predetermined value of the highest white/gray gradation is already stored in the CPU 15, or may be input by a user wishing to use a predetermined value for comparison. FIG. 3 is a flow chart depicting the operation of the feedback control used to carry out the operation of automatic calibration.

As depicted at step 31 in FIG. 3, when the predetermined voltage 1 is generated resulting in the digital image output signal 14, the CPU 15 reads the current digital image output signal 14. After comparing output signal 14 to the predetermined value stored in CPU, the CPU produces the digital output control signal 16. This digital control signal 16, after being converted to an analog feedback voltage control signal 18, is added to the original predetermined voltage 1 in the adder 2.

Figure 1:
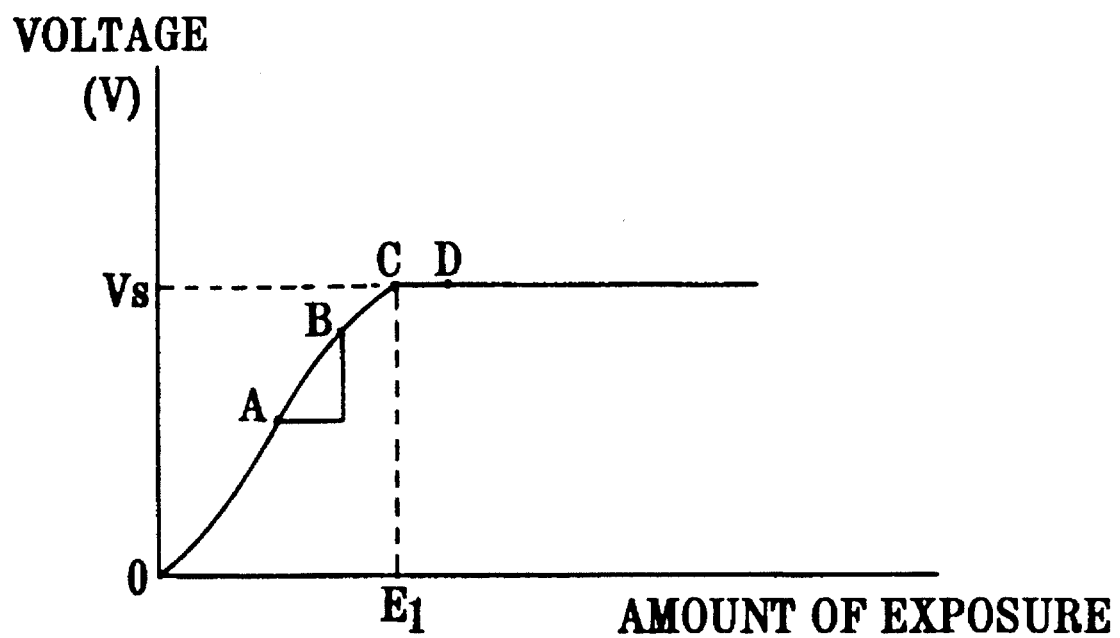
FIG. 1 is the photo-electric effect characteristic curve of a CCD after it has been irradiated by light.

As a result, the digital control signal 16 is increased at step 32, and a new digital image output signal 14 is thus produced. At step 33, the CPU 15 reads this new digital image output signal 14. At step 34, if the new digital image output signal 14 is larger than the previous ones, it indicates that the CCD 11 is still operating within its operational range. Then, as shown in FIG. 1, the CCD output signal is adjusted in the direction from the point A to the point B of the saturation voltage curve. After the new digital output signal 14 is compared to the predetermined value already stored in the CPU 15, a new digital control signal 16 is produced and the process returns to step 32 to carry out the operation of adjusting the digital controlled signal to a larger level.

After this operation is repeated several times, the output voltage 12 of the CCD 11 gradually reaches point C (the critical saturation voltage) on the operational curve. At step 34, if a judgment is made that this new digital image output signal is not larger than the previous ones, it indicates that the output voltage of the CCD 11 has already reached the value of the saturation voltage Vs, or may have exceeded point C (the critical saturation voltage), and reached the point D (FIG. 1). Therefore, the digital control signal 16 is decreased at step 35. After the decreased digital control signal 16 is converted to the analog feedback voltage control signal 18, it is added to the original predetermined voltage 1 in the adder 2 as described above, to produce a new digital output signal 14.

Then at step 36, the CPU 15 reads the new digital image output signal 14 again, and at step 37, compares this new signal to the previous image output signal. If this new digital image output signal is still not smaller than the previous ones, it indicates that the CCD 11 is still operating in its saturation range, and the process returns to step 35 again to decrease the digital control signal 16. After this operation is repeated several times, at step 37, the new digital image output signal 14 is detected as being a little smaller than the previous signals 14. This indicates that the output voltage of the CCD 11 is already very close to the point C in the curve of FIG. 1. Therefore, at step 38, the current digital control signal is stored and used to control power supply 3. Thus, the adjustment to achieve the maximum gray gradation range of the CCD 11 is completed, making all the photo-electric characteristics curve of the CCD 11 remain in its operational range. As a result, the identification capability of the CCD 11 reaches its highest level, allowing the CCD 11 to have its best image quality.

When the photo-electric feedback compensation controlled apparatus of the present invention is used on an optical color scanner, it is capable of identifying different red, blue and green photo-electric conversion rates and adjusting the brightness of the light source automatically. Therefore, it can solve the problem of the differences operates when a scanner analyzes characteristics for three color gray gradations.

The photo-electric feedback compensation controlled apparatus of the present invention may automatically adjust itself within a very short period of time to reach the optimal operating range of a CCD, allowing the resolution of the CCD to reach an optimum level, producing the best image quality, a large S/N value, and eliminating the problems of the differences generated in the operational characteristics of CCD's caused by differences in timing and environment.

Although a preferred embodiment of the present invention has been described herein, it will be appreciated by those skilled in the art that various modification can be made without materially departing from the novel teaching and advantages of this invention. Accordingly, it is to be understood that all such modifications and alteration fall within the scope of this invention as defined by the following claims.

We claim:

1. A photo-electric feedback compensation-controlled imager comprising:

a) a power supply operating responsive to a predetermined voltage and a feedback signal to produce an output power;

b) a light source operating responsive to said output power to emit a light signal;

c) a charge couple device (CCD) operating responsive to said light signal to generate an analog image output signal; and, d) a central processing unit (CPU) operating responsive to said analog image output signal and comprising
   i) means for generating said feedback signal;
   ii) means for measuring image signal strength;
   iii) first means for increasing said feedback signal based upon said image signal strength until image signal strength no longer increases in response to an increase in said feedback signal;
   iv) second means, operating responsive to said first means, for decreasing said feedback signal strength based upon image signal strength until a first decrease in image signal strength occurs; and
   v) means for storing a feedback signal value corresponding to said first decrease in image signal strength.

2. The imager of claim 1, wherein said CPU further comprises:
   vi) means for adjusting said feedback signal output in accordance with said stored value of said feedback signal.

3. The imager of claim 2, further comprising:

e) a white plate having a standard white optimum reflective surface arranged to reflect light emitted from said light source to said CCD.

4. The imager of claim 3, further comprising:

f) an analog-to-digital converter arranged to convert said analog image signal from said CCD to a digital image output signal input to said CPU; and g) a digital-to-analog converter arranged to convert the feedback signal in digital form from said CPU to an analog form constituting said feedback signal received by said power supply.

5. The imager of claim 4, further comprising:

h) an optical system arranged to direct light reflected from said light plate to said CCD.

6. The imager of claim 5, further comprising a plurality of additional plates corresponding to a plurality of different colors and operating in conjunction with said white plate.

* * * * *